United States Patent [19]

Flyghagen et al.

[11] Patent Number: 5,215,514
[45] Date of Patent: Jun. 1, 1993

[54] METHOD AND ARRANGEMENT IN A BAG-MAKING MACHINE FOR FORMING WELD LINES IN A WEB FED THERETHROUGH

[75] Inventors: Jan Flyghagen, Rydsgård; Roland Olsson, Löderup, both of Sweden

[73] Assignee: Fas Converting Machinery AB, Ystad, Sweden

[21] Appl. No.: 946,131

[22] Filed: Sep. 17, 1992

Related U.S. Application Data

[63] Continuation of Ser. No. 772,579, Oct. 7, 1991, abandoned.

[30] Foreign Application Priority Data

Sep. 6, 1991 [SE] Sweden ............................ 9102572

[51] Int. Cl.$^5$ ............................................. B31B 23/60
[52] U.S. Cl. .................................... 493/193; 493/205
[58] Field of Search .......................... 493/193–198, 493/205–208, 24, 25; 53/373.5, 373.6, 373.7, 550, 562; 156/582, 583.5

[56] References Cited

U.S. PATENT DOCUMENTS

| | | | |
|---|---|---|---|
| 2,680,471 | 6/1954 | Mercer | 493/197 |
| 3,797,368 | 3/1974 | Martelli | 93/8 R |
| 3,943,683 | 3/1976 | Kovacs | 53/51 |
| 4,332,578 | 6/1982 | Van der Meulin | 493/197 |
| 4,380,446 | 4/1983 | Dickson . | |
| 4,567,984 | 2/1986 | Gietman, Jr. . | |
| 4,642,084 | 2/1987 | Gietman, Jr. . | |
| 4,758,293 | 7/1988 | Samida | 156/73.1 |
| 4,934,993 | 6/1990 | Gietman, Jr. . | |
| 4,950,217 | 8/1990 | Stenquist . | |

Primary Examiner—Bruce M. Kisliuk
Assistant Examiner—Jack Lavinder
Attorney, Agent, or Firm—Beveridge, DeGrandi, Weilacher & Young

[57] ABSTRACT

An arrangement in a bag-making machine for forming weld lines in a web continuously fed through the machine, preferably a flattened plastic film tube, comprises a cylindrical, freely rotatable drum; a driving belt which is adapted to rotate the drum and pressed against part of the circumferential surface of the drum; and a number of transverse sealing jaws which, as the drum rotates, are movable into engagement with and drivable together with the web for welding the web through a predetermined angle of drum rotation. In order to achieve a high speed of the web, preferably about 150 m/min., and high flexibility in respect of the available range of bag length, the sealing jaws are freely movable relative to the drum outside the circumferential surface thereof and controlled by a control device which is adapted to hold each sealing jaw in a stand-by-position out of engagement with the web, and successively to bring each sealing jaw into engagement with the web with a certain time delay relative to each other. The welding is effected over a constant and relatively long welding distance.

In a method of producing, in such a bag-making machine, weld lines in a web which is continuously fed through the machine, the sealing jaws are first held in the stand-by position out of engagement with the web and are then brought into engagement with the web and driven around the drum while performing the welding.

25 Claims, 5 Drawing Sheets

METHOD AND ARRANGEMENT IN A BAG-MAKING MACHINE FOR FORMING WELD LINES IN A WEB FED THERETHROUGH

This application is a continuation of application Ser. No. 07/772,579, filed Oct. 7, 1991 now abandoned.

TECHNICAL FIELD OF THE INVENTION

The present invention relates to an arrangement in a bag-making machine for forming weld lines in a web fed therethrough. The invention also relates to a method of producing weld lines in a web which is fed through such a bag-making machine.

BACKGROUND OF THE INVENTION

Different types of machines are available for making plastic bags in rolls. These machines generally operate according to the principle that a web consisting of a flattened plastic film tube is fed into the machine in which the web is provided with transverse weld lines and lines of perforation. The weld lines form the seals of the bags, whereas the lines of perforation define the bag lengths. At the end of or after the machine, the web provided with these lines is rolled up on rolls. Most prior art machines of this type have some units in common, viz. a feeding unit, a perforation unit, a welding unit, a cooling unit, a discharge unit and a rolling-up unit.

An example of such a machine is disclosed in U.S. Pat. No. 4,950,217 and the counterpart EP-A-0,333,726. This prior art machine comprises a welding unit having two opposite chain and guide pulley devices with transverse sealing jaws which are pressed against each other so as to clamp the web descending through the machine. This machine functions in a per se satisfactory manner, but has certain limitations as to the speed of the web, which depends on, inter alia, the relatively short time available for the welding operation as the web is fed through the welding unit. Normally, this and similar machines can be run at a maximum web speed of about 260-295 feet/min (80-90 m/min). However, there are increasing demands on the market that bag-making machines should be operable at considerably higher web speeds, preferably about 500 feet/min (150 m/min), which is one of the basic points of the present invention.

One reason why a bag-making machine that can stand up to high speeds of the web should be developed is that modern extruders for producing the plastic film tube to be fed into the bag-making machine are operated at speeds of at least 400 feet/min (120 m/min). Since such an extruder is usually positioned directly before a bag-making machine, it must of course be aimed at the two machines being capable of operating at substantially the same speed.

Other types of bag-making machines are provided with a rotary drum, the web being passed over part of the circumferential surface of the drum so as to be welded by means of sealing jaws disposed thereon. U.S. Pat. No. 4,380,446 discloses such a machine having a vertical drum with a number of sealing jaws which extend along generatrices on the circumferential surface of the drum. As seen from the end of the drum, the sealing jaws are distributed equiangularly with respect to the shaft of the drum. The radial distance between the sealing jaws and the shaft of the drum is to some extent adjustable for providing different spacings between the weld lines. This "spoke arrangement" with a substantially fixed angular distribution of the sealing jaws yields, however, limitations both as to the available range of bag length and as to the maximum web speed.

U.S. Pat. No. 4,567,984 and 4,642,084 disclose a bag-making machine which is also provided with a sealing or welding drum which in this case is horizontal and rotated by a belt laid around part of the circumferential surface of the drum, the web being passed therebetween. Over the circumferential surface of the drum a number of sealing jaws are arranged, which extend along generatrices of the drum and transversely of the direction of travel of the web. The sealing jaws are supported at each end of the drum by a spoke arrangement connected to the drum shaft. For different bag lengths, the diameter of the drum is variable in that the radial distance between the sealing jaws and the shaft of the drum is adjustable. Thus, short bags are run at a small drum diameter, and long bags at a large drum diameter. To this end, the spokes included in the spoke arrangement, which at their free end carry the sealing jaws, are hinged bars which are fixedly mounted on a hub of the drum shaft and distributed equiangularly.

However, the welding unit of this known bag-making machine has certain limitations and drawbacks as will be described below.

The available bag length interval is restricted and depends on the variation in diameter of the drum. The lower limit of the bag length is determined by the angular distribution of the spokes carrying the sealing jaws, whereas the upper limit is determined by the maximum diameter of the drum. To date, the possible range of bag length has been about 6-70 inches (150-1800 mm).

The welding distance, i.e. the circular arc along which a sealing jaw is engaged with the web for welding, varies with the bag length. When producing short bags, the welding distance is short, which may jeopardise the quality of the welding. This problem is, of course, further accentuated if at the same time the rate of production is high, since the welding time will then be too short.

The sealing jaws cannot be controlled individually, since they are connected directly to the rotation of the drum, which limits the flexibility of the machine.

The spoke arrangements which support the sealing jaws and enable the variation in drum diameter are rather complicated.

The relevant background art also includes the bag-making machine according to U.S. Pat. No. 4,934,993, which is a further development of the machine disclosed in the two U.S. patents discussed above. According to this last variant, the diameter of the welding drum can be set during operation by means of a special device which actuates the spoke arrangements positioned at each end of the drum and carrying the sealing jaws. Nevertheless, this prior art machine suffers from the same drawbacks as its predecessor.

OBJECTS OF THE INVENTION

One object of the present invention therefore is to overcome the above-mentioned drawbacks of the prior art machines by providing an improved arrangement in a bag-making machine for forming weld lines in a web fed through the machine, the arrangement enabling a web speed of at least about 500 feet/min (150 m/min).

Another object of the invention is to provide a flexible arrangement in which the weld lines can be produced in the web at any desired locations, without dependence on the unit which advances the web, and without necessitating a welding drum of variable diameter.

A further object of the invention is to provide a welding unit which has capacity for a considerably greater range of bag length as compared to prior art.

A special object of the invention is to provide a welding unit which renders a long and constant welding distance possible, independently of the bag length.

A still further object of the invention is to provide a bag-making machine of the above-mentioned type, which overcomes or at least reduces the above-mentioned drawbacks to a considerable extent, and which has a rate of production of about 500 feet/min (150 m/min).

The invention also has for its object to provide a method of producing in a bag-making machine, without the above-mentioned drawbacks, weld lines in a web which is continuously fed through the machine at a high speed, about 500 feet/min (150 m/min).

SUMMARY OF THE INVENTION

These and further objects indicated hereinafter have now been achieved by means of an arrangement in a bag-making machine for forming weld lines in a web continuously fed through said machine, preferably a flattened plastic film tube, said arrangement comprising a cylindrical drum which is freely rotatable and mounted transversely of the direction of travel of said web; a driven belt adaped to continuously rotate said drum and pressed against part of the circumferential surface of said drum, said part corresponding to a predetermined angle of drum rotation, which is less than one revolution, preferably about 160°-250°, said web being pressed, through said angle of rotation, between said driving belt and the circumferential surface of said drum for advancing said web through said machine; and a number of transverse sealing jaws disposed in connection with the circumferential surface of said drum and movable into engagement with said web carried by said drum and drivable together with said web for welding said web through said angle of rotation.

The arrangement according to the invention is characterised by the fact that said sealing jaws are freely movable relative to said drum outside the circumferential surface thereof and controlled by a control device which is adapted to hold each sealing jaw in a stand-by position out of engagement with said web, and to bring said sealing jaws into engagement with said web one by one with a certain time delay relative to each other so as to produce weld lines in said web with a desired relative spacing, in that said sealing jaws engaging said web are successively driven through said angle of rotation and subsequently placed in a stand-by position.

The objects laid down are also achieved by a bag-making machine including an arrangement of the above-mentioned type.

The objects are also achieved by a method of forming, in a bag-making machine, weld lines in a web, preferably a flattened plastic film tube, which is continuously fed through said machine by means of a cylindrical, transverse drum which is continuously rotated by a driven belt which is pressed against part of the circumferential surface of said drum, said part corresponding to a predetermined angle of rotation of said drum, which is less than one revolution, preferably about 160°-250°, said web being pressed, through said angle of rotation, between said driving belt and the circumferential surface of said drum in such a manner that said web is advanced through said machine, a number of transverse sealing jaws disposed in connection with the circumferential surface of said drum being brought into engagement with said web carried by said drum and driven together with said web for welding the same through said angle of rotation.

The method according to the invention is characterised by the fact that said sealing jaws, before engaging said web, are kept in a stand-by position out of engagement with said web, said sealing jaws being brought into engagement with said web one by one with a certain time delay relative to each other, and said sealing jaws engaging said web being successively driven through said angle of rotation and subsequently placed in a stand-by position, thereby producing said weld lines in said web with a desired relative spacing.

Further features of the invention are stated in the appended claims.

The invention will now be described in more detail with reference to the accompanying drawings which schematically illustrate a preferred embodiment.

DESCRIPTION OF A PREFERRED EMBODIMENT

Figure 1:
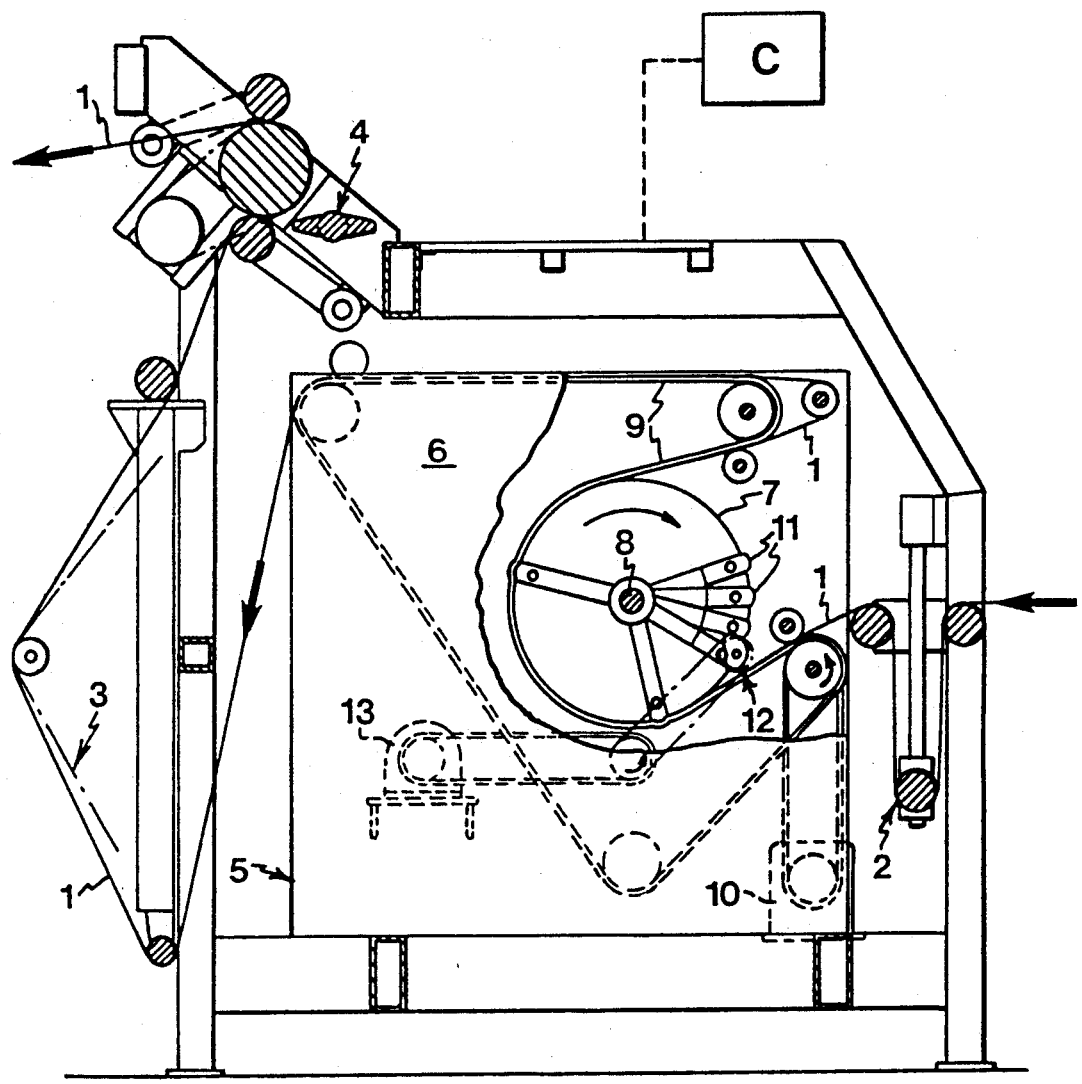
FIG. 1 is a vertical projection of a bag-making machine comprising the invention, partly in section and with certain parts removed.

FIG. 1 shows a bag-making machine through which a web 1, preferably a flattened plastic film tube, is fed in the direction indicated by the arrows. The bag-making machine includes some known parts which are not comprised by the invention but included merely for better understanding, viz. a feeding unit 2, an optional folding unit 3 and a perforation unit 4. The machine also includes a sealing or welding unit generally designated 5, which comprises the actual invention and is positioned between the feeding unit 2 and the folding unit 3. Thus, the web 1 is continuously advanced from the feeding unit 2 to the welding unit 5 in which transverse weld or sealing lines are made in the web, then to the folding unit 3 in which the web is folded, and finally to the perforation unit 4 in which transverse lines of perforation are made in the web 1 which eventually can be rolled up on a roll after the machine (not shown).

A side portion 6 of the frame of the machine is cut open to illustrate a cylindrical sealing or welding drum 7 which is freely rotated on a stationary shaft 8 and disposed transversely of the travelling direction of the web 1 through the machine. The drum 7 included in the welding unit 5 is of a constant diameter and is continuously rotated by means of a band or belt 9 which is pressed against part of the circumferential surface of the drum 7. The belt 9 is passed in a closed loop around a number of guiding rollers and driven by a motor 10 with a belt transmission.

Thus, the web 1 is advanced into the welding unit 5 between the driving belt 9 and the circumferential surface of the drum 7. The part of the drum 7 where the web 1 and the belt 9 are passed together over the circumferential surface corresponds to a predetermined angle of rotation of the drum 7 which is less than one revolution. This angle of rotation preferably is in the range of 160°-250°, in the embodiment shown about 180° or slightly more.

In connection with the circumferential surface of the drum 7 there are a number of transverse sealing jaws 11 which will be described in more detail below. The sealing jaws 11 are freely mounted and parallel to the shaft 8 of the drum 7. The jaws 11 are engaged with the web 1 carried by the drum 7 and driven together with the drum 7 so as to weld the web 1 through the above-mentioned angle of rotation. As a result, the weld lines are produced in the web 1. The sealing jaws 11 are operated by a special operating or control device which will be described in more detail below and comprises two similar operating or control means 12, one at each end of the drum 7. Such a control means 12 is schematically shown in FIG. 1. The control means 12 is driven by a motor 13 with a belt transmission.

The arrangement suggested according to the invention for forming weld lines in the web 1 will be described in more detail hereinafter with reference to FIGS. 2-5.

Figure 2:
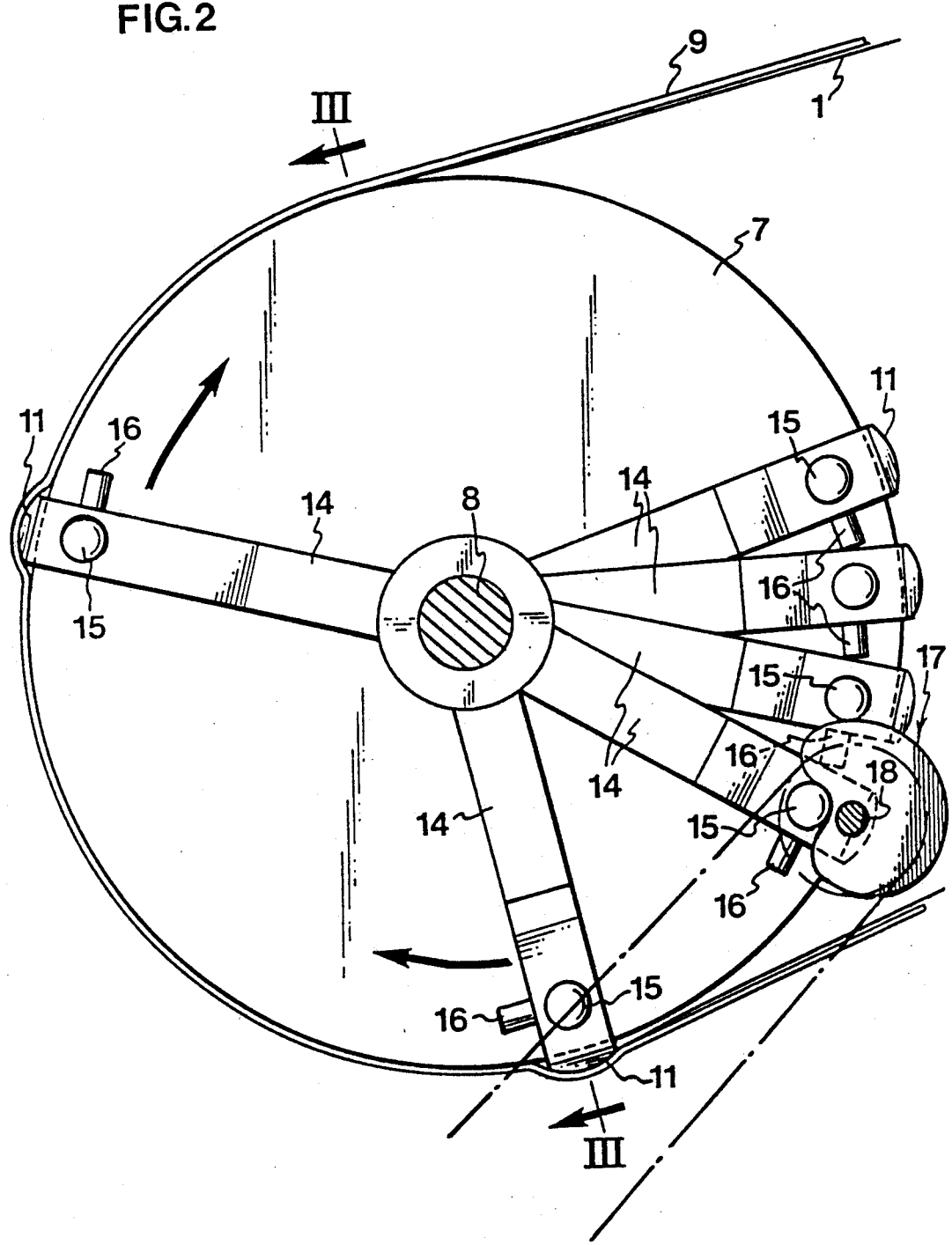
FIG. 2 illustrates, on a larger scale, the end of a welding drum which is included in the machine in FIG. 1.

FIG. 2 illustrates how six sealing jaws 11 are supported at one end of the drum 7. Each sealing jaw 11 is carried by two radial arms 14 which are disposed at each end of the drum 7 and each have their inner end freely mounted on the shaft 8 of the drum 7 and their outer end connected to the end portion of the sealing jaw 11. The outer end of each arm 14 has a projection extending in parallel with the shaft 8 and fitted with a ball bearing 15 which is mounted on a pin, and a spacer means 16 in the form of a rubber damping member for impinging on the arm 14 of the sealing jaw 11 in front.

The control means 12 disposed at each end of the welding drum 7 comprises a cam disc which is generally designated 17 and adapted to engage the ball-bearing projections 15 of the arms 14, as will be described below. The cam disc 17 is non-rotatably connected to a shaft 18 which is rotatably mounted in the frame of the machine, e.g. the side portion 6.

Figure 3:
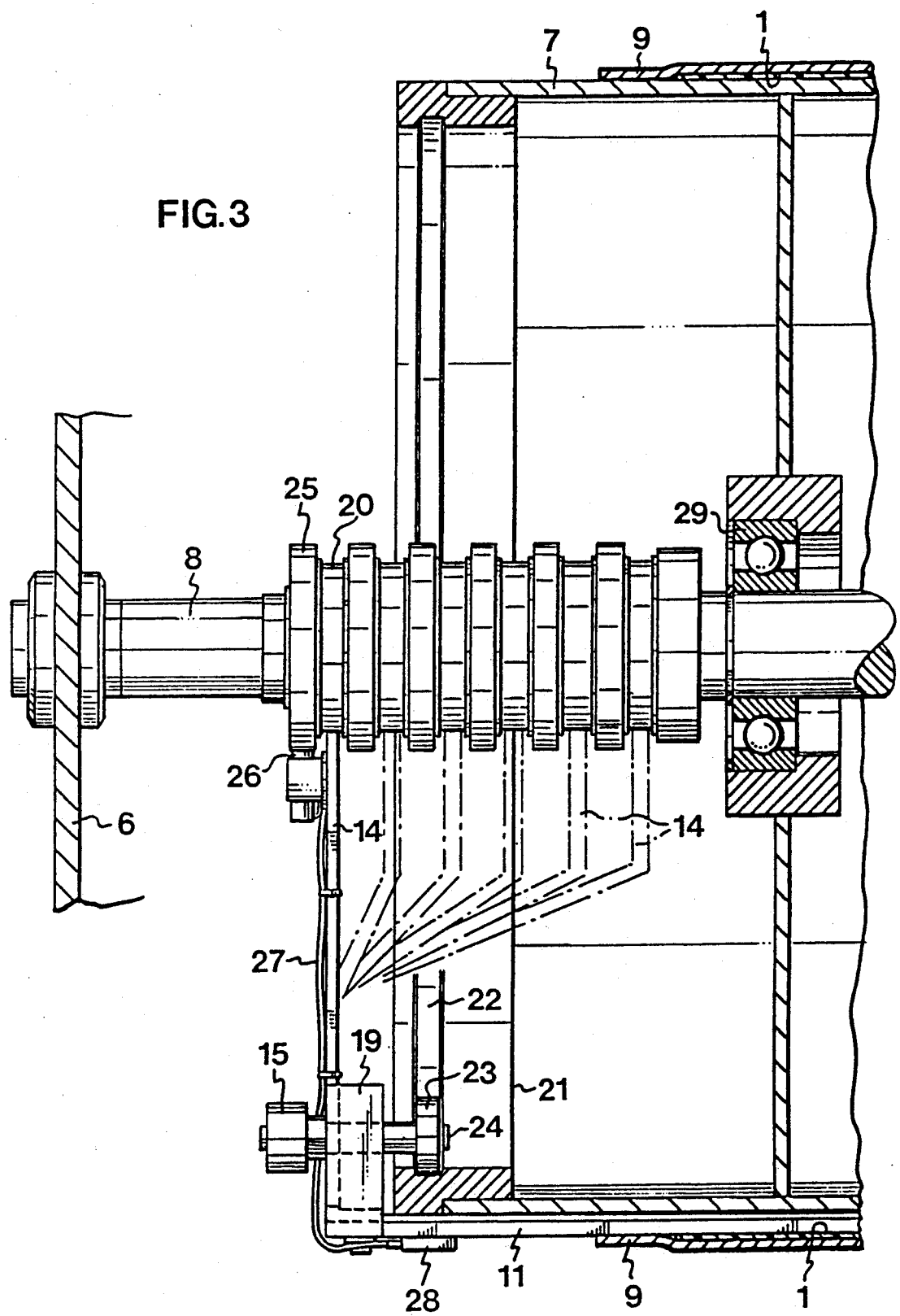
FIG. 3 is a part-sectional view on a still larger scale, taken along the line III—III in FIG. 2.

FIG. 3 shows how a sealing jaw 11 is freely mounted on the fixed shaft 8. The sealing jaw 11 is detachably arranged on a mounting 19 from which the ball-bearing projection 15 projects and from which the radial arm 14 extends inwardly to the shaft 8. The inner end of the arm 14 is connected to a bearing ring 20 which is freely mounted on the shaft 8. The remaining sealing jaws 11 are mounted on the shaft 8 by means of similar arms 14 and bearing rings 20, as indicated by dash-dot lines in the Figure. For additional control of the movement of the sealing jaws 11 around the shaft 8, the welding drum 7 is provided with an annular terminal member 21 with an annular inner groove 22 in which a ball bearing 23 runs which is mounted on a pin 24 projecting from the mounting 19.

FIG. 3 also shows the power supply to the sealing jaw 11. On the shaft 8 there is mounted a current-carrying copper ring 25 which is in contact with a brush 26 attached to the arm 14. Thus, power is taken from the copper ring 25 and conducted via the brush 26 and a wire 27 to a switch 28 on the sealing jaw 11 which in a known manner comprises a longitudinal internal conductor (not shown). When the sealing jaws 11 are pivoted via the arms 14 around the shaft 8, the brushes 26 are moved around the copper rings 25 at a low circumferential speed, which ensures a satisfactory contact and transmission of power. The six copper rings 25 and the bearing rings 20 are slipped onto the shaft 8 with inserts consisting of insulating washers and thus form a set of bearings. FIG. 3 also illustrates the bearing 29 of the drum 7, fitted on the shaft 8.

Figure 4:
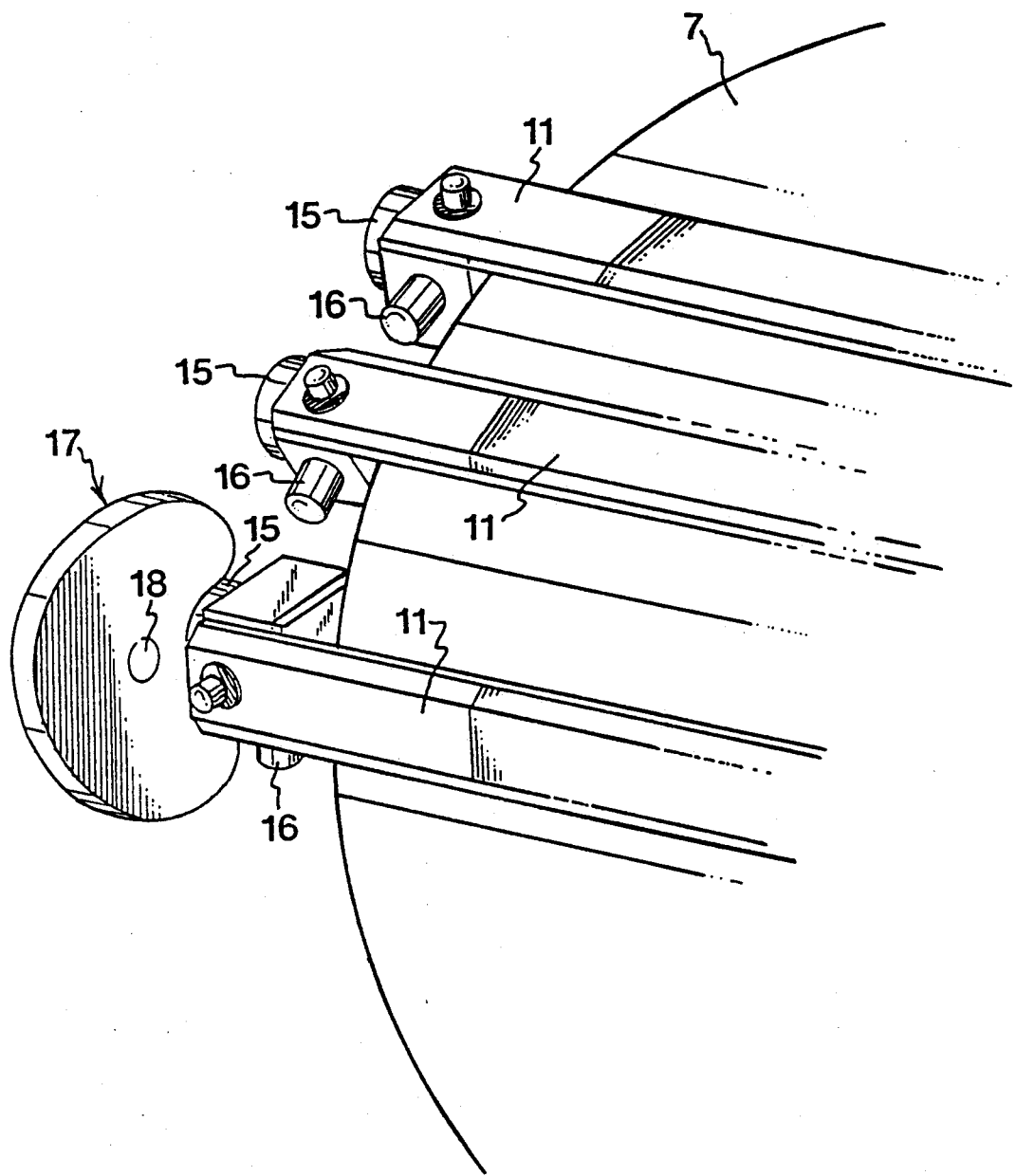
FIG. 4 is a perspective view of one end portion of the drum shown in FIG. 2.

FIG. 4 is a perspective view of three sealing jaws 11 which are moved apart. The ball-bearing projection 15 of the lower sealing jaw 11 engages the rotary cam disc 17. The sealing jaws 11 are preferably disposed at a short distance from the circumferential surface of the drum 7. Alternatively, the inner side of the sealing jaws 11 can be permitted to trail lightly against the circumferential surface.

In prior art welding units in similar bag-making machines, the sealing jaws are connected to a hub mounted on the shaft of the drum and thus are distributed equiangularly, which, inter alia, restricts the flexibility with regard to the available range of bag length. According to the invention, the sealing jaws 11 are instead freely movable relative to the drum 7 outside the circumferential surface thereof. Moreover, the sealing jaws 11 are controlled by a special control device which is adapted to hold each sealing jaw 11 in a stand-by position out of engagement with the web 1, and to move the sealing jaws 11 into engagement with the web 1 one by one with a certain time delay relative to each other so as to make weld lines in the web 8 with desired spacings, in that the sealing jaws 11 which engage the web 1 are driven around the drum 7 and subsequently placed in the stand-by position. This is illustrated in more detail in FIGS. 5A-5C.

Figure 5A:
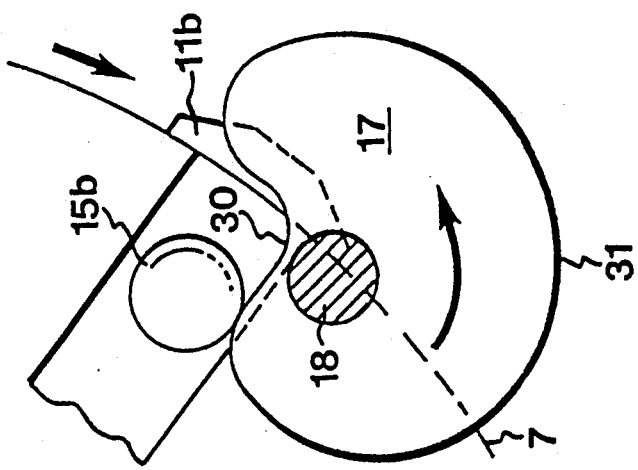
FIGS. 5A, 5B and 5C are schematic views of part of a control device at one end of the drum.
Figure 5B:
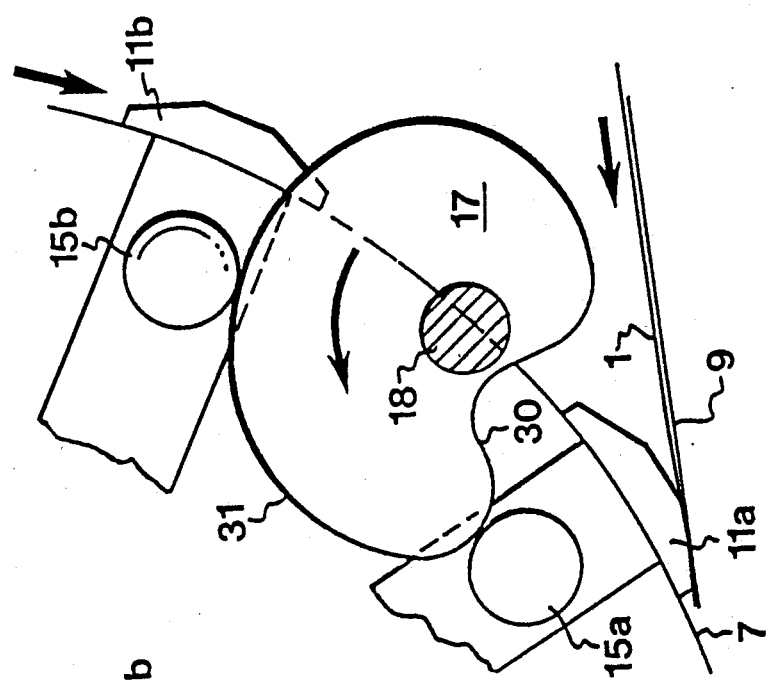

FIG. 5A shows the cam disc 17 which is roated by means of the cam shaft 18 and which has a curved circumference forming a cam control surface for engaging the ball-bearing projections 15 on each sealing jaw holder. The cam disc 17 has a recessed portion 30 and a ridge portion 31. FIG. 5A shows how a ball-bearing projection 15a of a first sealing jaw 11a engages the recessed portion 30 of the cam disc 17, while the corresponding ball-bearing projection 15b of a second sealing jaw 11b engages the ridge portion 31. The two sealing jaws 11a, 11b are here held in a stand-by position out of engagement with the web 1. As the cam disc 17 is rotated anti-clockwise, the projection 15a is moved out of the recessed portion 30 and the sealing 11a is released into engagement with the web 1 carried by the belt 9 (FIG. 5B) so as to be advanced around the drum 7 clockwise (cf. FIG. 2). In this position, the second sealing jaw 11b still is in the stand-by position, the projection 15b engaging the ridge portion 31 of the cam disc 17.

Because of the special design of the cam disc 17, the sealing jaw 11a is accelerated in such a manner that when engaging the web 1, it has a circumferential speed which substantially corresponds with the speed of the driving belt 9 carrying the web 1. Since the belt 9 is always wider than the web 1 (see FIG. 3), there will be a frictional engagement between the sealing jaw 11a and the belt 9, which accomplishes the driving of the sealing jaw 11a at the moment of engagement.

Figure 5C:
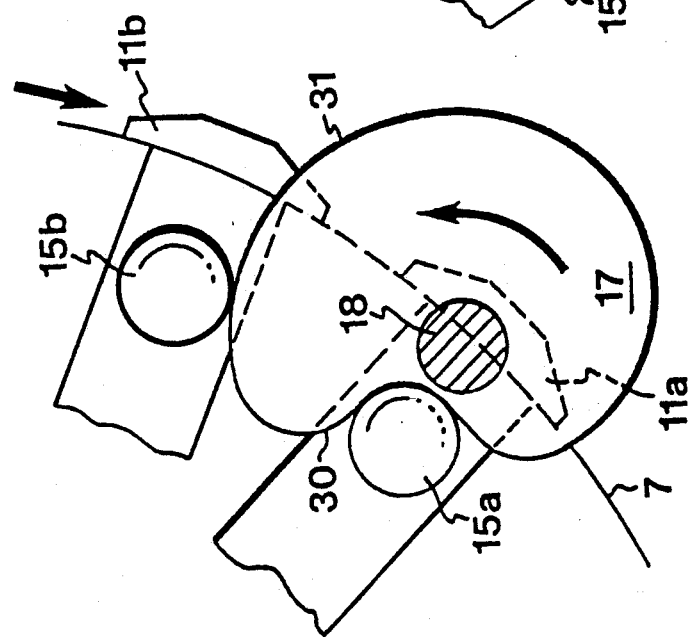

As the cam disc 17 continues to rotate anti-clockwise, the projection 15b of the second sealing jaw 11b is eventually moved to the position shown in FIG. 5C, i.e. it will move into the recessed portion 30 of the cam disc 17. After further rotation of the cam disc 17, the second sealing jaw 11b will also be allowed to pass the cam disc 17 and be brought into engagement with the web 1 so as to effect the welding around the drum 7.

Owing to the cam disc 17, the sealing jaws 11 are first held in a stand-by position out of engagement with the web 1 and subsequently brought into engagement therewith one by one, according to the desired spacing between the weld lines. The desired time delay is achieved by adapting the rotation of the cam disc 17 to the speed of the belt 9. The cam disc 17 can also be stopped in the stand-by position and retain a sealing jaw 11 for a certain time. It is usually required that the welding unit itself should compensate for changes in the speed of the web. This is achieved in that during operation, the rotation of the cam disc 17 is adapted by means of a computer-aided control unit C to the operation of the driving belt 9, corresponding with the speed of the web, thereby obtaining a constant spacing between the weld lines.

In the embodiment illustrated, the control device which controls the engagement of the sealing jaws 11 comprises two similar control means 12 which are arranged on both sides of the welding drum 7 at each end thereof and each of which comprises said rotatable cam disc 17 for engaging the projections 15 of each sealing jaw 11. However, it will be appreciated that other control devices for successively engaging the freely mounted sealing jaws 11 can be used.

The arrangement according to the invention functions as follows. The web 1 is fed into the welding unit 5 by means of the driving belt 9 which drives the drum 7. After a certain rotation of the cam disc 17, a sealing jaw 11 previously retained by the disc is released and brought into engagement with the web 1, whereupon the sealing jaw 11 is driven through the above-mentioned angle of rotation around the drum 7, while a weld line is formed in the web 1 (see FIG. 2). For example, two sealing jaws 11 are simultaneously moved clockwise around the drum 7 for welding. After the welding around the drum 7 has been finished, the sealing jaws 11 are arranged in a queue above the cam disc 17. As the cam disc 17 rotates, one sealing jaw at a time is advanced into the recessed portion 30 of the cam disc 17, from which it is then released so as to engage the web 1.

The parameters of the bag-making machine are suitably set on a control panel connected to the computer-aided control unit. On the control panel, the operator sets e.g. the desired spacing between the weld lines and the lines of perforation. The regulating system of the control device then automatically compensates for any variations in these parameters, while maintaining the desired bag length.

The movement of rotation of the two cam discs included in the control device can be programmed by means of the computer-aided control unit in a fully optional manner, including any standstill of the cam discs. Theoretically, bags of different lengths can be produced alternately in one and the same web by completely individual control of the sealing jaws. However, in most cases bags of the same length are produced, the movement of rotation of the cam discs being adapted to the operation of the driving belt in such a manner that a predetermined constant spacing between the weld lines is obtained.

In a manner known per se, the spacings between the lines of perforation and the weld lines are also optionally adjustable, independently of each other during operation (cf. U.S. Pat. No. 4,950,217). For reasons of elucidation, the devices intended for this purpose have been excluded from this specification, as has also the equipment which is used to measure the web speed and the rotation of the drum and the cam disc etc.

Practical experiments in a bag-making machine comprising a welding unit according to the invention have yielded excellent results. The welding drum used was 47¼ inches (1200 mm) long, the diameter being 15¾ inches (400 mm). The width of the driving belt was 43⅜ inches (1100 mm), and the webs used were of a width up to 39⅜ inches (1000 mm). The bag-making machine was run in continuous operation at web speeds of about 500 feet/min (150 m/min), the results being most satisfactory. The excellent result of the welding is due to the fact that the welding time is comparatively long, i.e. the welding is effected through a fairly large angle of rotation around the drum.

The drum included in the welding unit according to the invention is of simple design with a constant diameter and a smooth circumferential surface. Previously known drums in similar bag-making machines are more complicated, mainly because they are variable in diameter.

As essential advantage of the welding unit according to the invention is that the welding distance is the same all the time, independently of the bag length. The welding distance corresponds to a circular arc which is calculated according to the formula:

$$s = \frac{\pi \cdot d \cdot \alpha}{360°}, \text{ wherein}$$

s = welding distance
d = drum diameter
α = angle of rotation during welding

In the above-mentioned practical experiments, the web and the belt were passed together over the circumferential surface of the drum through about 180°, and the welding distance thus was about 24¾ inches (630 mm), independently of the bag length that was run.

Furthermore, according to the invention the important advantage is achieved that the available range of bag length has no upper limit. Essentially, bags of any length can be produced by appropriate control of the sealing jaws. Since the jaws are released so as to engage the web with a considerable time delay, bags having a length of several feet (meters) can be produced. The sealing jaws thus can be controlled fully individually, which is especially advantageous if the web is provided with printed patterns with marks, according to which the welding and the perforation are to be effected. In practice, the lower limit of the bag length will be about 6–8 inches (150–200 mm), depending on the number of sealing jaws and the drum diameter.

A further practical advantage is that the sealing jaws are readily exchangeable. In a few simple motions, a fitter will dismantle the sealing jaws which are arranged in a queue.

Finally, it should be pointed out that the invention is in no way to be considered restricted to the embodiment described above, but several modifications are possible within the scope of the accompanying claims. For instance, the welding unit can be provided with a smaller or larger number of sealing jaws which are mounted and controlled in a different manner. However, the important thing is that the sealing jaws are freely movable relative to the drum outside the circumferential surface thereof. It will also be appreciated that the control device which controls the sealing jaws can be differently designed from that described above. Controlling by means of cam discs and projections fitted on the sealing jaw holders represents but a preferred embodiment. Finally, it should be pointed out once more that the known units of the bag-making machine, i.e. the feeding and discharge units, the perforation unit etc. can be arranged in some different manner; for example, perforation can be performed before welding.

What we claim and desire to secure by Letters Patent is:

1. Arrangement in a bag-making machine for forming weld lines in a web continuously fed through said machine, said arrangement comprising a cylindrical drum which is freely rotatable and mounted transversely of the direction of travel of said web; a driven belt adapted to continuously rotate said drum, said belt being pressed against part of the circumferential surface of said drum, said part corresponding to a predetermined angle of drum rotation, which is less than one revolution, preferably about 160°–250°, said web being pressed, through said angle of rotation, between said driving belt and the circumferential surface of said drum for advancing said web through said machine; a number of transverse sealing jaws rotatably disposed outside the circumferential surface of said drum, wherein each of said sealing jaws is freely rotatable about the drum axis relative to said drum outside the circumferential surface thereof, said jaws being movable into engagement with said web carried by said drum and driven together with said web by said belt for welding said web through said angle of rotation; and a control device positioned to hold each sealing jaw in a stand-by position out of engagement with said web, and to bring said sealing jaws into engagement with said web one by one with a certain time delay relative to each jaw so as to produce weld lines in said web with a desired relative spacing, in that said sealing jaws engaging said web are successively driven by said belt through said angle of rotation and subsequently placed in a stand-by position.

2. Arrangement as claimed in claim 1, wherein said control device comprises two similar control means which are disposed on both sides of said drum at each end thereof and each of which comprises a rotatable, driven disc of a curved circumference which forms a cam control surface for engaging a projection on one end portion of each sealing jaw, said cam control surface having a recessed portion which is adapted to retain a sealing jaw in a stand-by position and, after a certain rotation of the disc, to release the sealing jaw so as to engage said web and having a ridge portion which is adapted to retain simultaneously another, subsequent sealing jaw, until a preceding sealing jaw has been released, the subsequent sealing jaw being moved into said recessed portion.

3. Arrangement as claimed in claim 2, wherein said cam disc is designed in such a manner that said sealing jaws, when engaging said web, have a circumferential speed which substantially corresponds with the speed of said belt carrying said web.

4. Arrangement as claimed in claimed 2, having a computer-aided control unit for adjusting the rotation of the disc to produce a constant spacing between weld lines to produce bags of a desired length.

5. Arrangement as claimed in claim 1, wherein each sealing jaw has opposite ends provided with spacers which project toward the ends of an adjacent sealing jaw, said spacers being operable to keep said sealing jaws apart when they are in their stand-by positions.

6. Arrangement as claimed in claim 1, wherein each sealing jaw is freely mounted by means of two radial arms which are disposed at each end of said drum and each have an inner end freely mounted on a shaft end portion of said drum and an outer end connected to said end portion of said sealing jaw.

7. Bag-making machine, comprising an arrangement for forming weld lines according to claim 1.

8. Method of forming, in a bag-making machine, weld lines in a web, preferably a flattened plastic film tube, which is continuously fed through said machine by means of a cylindrical, transverse drum which is continuously rotated by a driven belt which is pressed against part of the circumferential surface of said drum, said part corresponding to a predetermined angle of rotation of said drum, which is less than one revolution, preferably about 160°–250°, said web being pressed, through said angle of rotation, between said driving belt and the circumferential surface of said drum in such a manner that said web is advanced through said machine, a number of transverse sealing jaws rotatably disposed outside with the circumferential surface of said drum wherein each of the sealing jaws is independently brought into engagement with said web carried by said drum and driven by said belt together with said web for welding the web through said angle of rotation, wherein said sealing jaws, before engaging said web, are kept in a stand-by position out of engagement with said web, said sealing jaws being brought into engagement with said web one by one with a certain time delay relative to each jaw, and said sealing jaws engaging and forming a weld line in said web and being successively driven by said belt through said angle of rotation outside the circumferential surface of the drum during the formation of the weld line and then subsequently placed in a stand-by position, thereby producing said weld lines in said web with a desired relative spacing.

9. Method as claimed in claim 8, wherein after having left said stand-by position, each sealing jaw is moved into engagement with said web which is carried by said driving belt and, thus, is driven by frictional engagement into contact position between said driving belt and the circumferential surface of said drum and driven through said angle of rotation.

10. Method as claimed in claim 8, wherein the successive engagement of said sealing jaws with said web is adapted to the operation of said driving belt in such a manner that a constant spacing between said weld lines is obtained for a certain, desired bag length, said engagement being regulated by a computer-aided control unit.

11. Apparatus for forming weld lines in a bag forming machine in which a web of bag material is continuously fed along a path in a machine direction, comprising,
a freely rotatable cylindrical drum having a circumferential surface,
a driven belt positioned to press the web against the drum and to rotate the drum, said belt being pressed against the drum in a pressing zone which is less than 360 degrees of the circumferential surface of the drum,
a plurality of sealing jaws which are transverse to the machine direction, each of said sealing jaws being rotatably supported for free movement relative to the drum in a path which is concentric with the drum and outside the circumferential surface of the drum, a control device for moving the sealing jaws into the pressing zone from a stand-by position which is spaced from the web, whereby the sealing jaws contact the web and move with the drum and belt through the pressing zone, said control device being operative to feed the sealing jaws one-by-one at timed intervals to provide weld lines at desired relative spacings.

12. Apparatus according to claim 11 wherein each sealing jaw has two end portions, and said control device includes units at each end of the drum, each said unit including a disc having a circumference which is a curved cam control surface, said cam control surface having a recessed portion which engages an end portion of a sealing jaw to hold the sealing jaw in said stand-by position, said disc being rotatably driven to a jaw-releasing position where the end portion and the sealing jaw are released for movement into said pressing zone, said disc having a ridge portion which is in a path of an end portion of a subsequent sealing jaw when the disc is at its jaw-releasing position, said disc being further rotatable until the end position of said subsequent sealing jaw lies in said recessed portion of the cam control surface.

13. Apparatus according to claim 12 wherein the disc has a shape and rotation which produce movement of the sealing jaws into contact with the web at speeds which correspond with the speed of said belt.

14. Apparatus according to claim 12 having a computer-aided control unit for adjusting the rotation of the disc to produce a constant spacing between weld lines to produce bags of a desired length.

15. Apparatus according to claim 11 wherein each sealing jaw has opposite ends provided with spacers which project toward the ends of an adjacent sealing jaw, said spacers being operable to keep said sealing jaws apart when they are in their stand-by positions.

16. Apparatus according to claim 11 having a shaft for supporting the drum, two radial arms disposed at opposite ends of said drum for supporting each sealing jaw, each radial arm having an inner end freely mounted on said shaft and an outer end connected to a sealing jaw.

17. A bag forming machine in which a web of bag material is continuously fed along a path in a machine direction, comprising a freely rotatable cylindrical drum having a circumferential surface, a driven belt positioned to press the web against the drum and to rotate the drum, said belt being pressed against the drum in a pressing zone which is less than 360 degrees of the circumferential surface of the drum, a plurality of sealing jaws which are transverse to the machine direction, each of said sealing jaws being rotatably supported for free movement relative to the drum in a path which is concentric with the drum and outside the circumferential surface of the drum, a control device for moving the sealing jaws into the pressing zone from a stand-by position which is spaced from the web, whereby the sealing jaws contact the web and move with the drum and belt through the pressing zone, said control device being operative to feed the sealing jaws one-by-one at timed intervals to provide weld lines at desired relative spacings.

18. A bag forming machine according to claim 17 wherein each sealing jaw has two end portions, and said control device includes units at each end of the drum, each said unit including a disc having a circumference which is a curved cam control surface, said cam control surface having a recessed portion which engages an end portion of a sealing jaw to hold the sealing jaw in said stand-by position, said disc being rotatably driven to a jaw-releasing position where the end portion and the sealing jaw are released for movement into said pressing zone, said disc having a ridge portion which is in a path of an end portion of a subsequent sealing jaw when the disc is at its jaw-releasing position, said disc being further rotatable until the end portion of said subsequent sealing jaw lies in said recessed portion of the cam control surface.

19. A bag forming machine according to claim 18 wherein the disc has a shape and rotation which produce movement of the sealing jaws into contact with the web at speeds which correspond with the speed of said belt.

20. A bag forming machine according to claim 18 having a computer-aided control unit for adjusting the rotation of the disc to produce a constant spacing between weld lines to produce bags of a desired length.

21. A bag forming machine according to claim 17 wherein each sealing jaw has opposite ends provided with spacers which project toward the ends of an adjacent sealing jaw, said spacers being operable to keep said sealing jaws apart when they are in their stand-by positions.

22. A bag forming machine according to claim 17 having a shaft for supporting the drum, two radial arms disposed at opposite ends of said drum for supporting each sealing jaw, each radial arm having an inner end freely mounted on said shaft and outer end connected to a sealing jaw.

23. A method of forming weld lines in a bag forming machine in which a web of bag material is continuously fed along a path in a machine direction, said machine including:

a freely rotatable cylindrical drum having a circumferential surface, a driven belt positioned to press the web against the drum to rotate the drum, a plurality of sealing jaws which are transverse to the machine direction, said method including the following steps:

pressing said belt against the drum in a pressing zone which is less than 360 degrees of the circumferential surface of the drum, using a control device to move the sealing jaws in a path which is concentric with the drum and outside the circumferential surface of the drum, said sealing jaws being moved into the pressing zone from a stand-by position which is spaced from the web, said sealing jaws contacting the web and moving with the drum and belt through the pressing zone, said control device feeding the sealing jaws one-by-one at timed intervals to provide weld lines at desired relative spacings.

24. A method according to claim 23 including the step of using the belt and the cylindrical drum to hold the sealing jaws frictionally against the web in the pressing zone.

25. A method according to claim 23 wherein the sealing jaws are moved into contact with the web at time intervals which provide a constant spacing between said weld lines.

* * * * *